United States Patent [19]

Schmidt

[11] Patent Number: 5,470,173
[45] Date of Patent: Nov. 28, 1995

[54] PROCESS FOR PRODUCING A RAILROAD CROSSING MEANS

[75] Inventor: Peter Schmidt, Waldkraiburg, Germany

[73] Assignee: Gummiwerk Kraiburg Development GmbH, Waldkraiburg, Germany

[21] Appl. No.: 343,788

[22] Filed: Nov. 22, 1994

Related U.S. Application Data

[63] Continuation of Ser. No. 938,135, Oct. 7, 1992, abandoned.

[30] Foreign Application Priority Data

Apr. 10, 1990 [DE] Germany ............... 40 11 599.2

[51] Int. Cl.⁶ ........................................ E01C 9/04
[52] U.S. Cl. .................. 404/32; 156/245; 238/8; 264/241
[58] Field of Search .................. 238/8, 257, 381; 264/241, 257, 259, 267, 269, 325; 404/17, 18, 32, 35, 34, 72, 73; 156/245

[56] References Cited

U.S. PATENT DOCUMENTS

| | | | |
|---|---|---|---|
| 1,967,904 | 7/1934 | Roberts | 404/32 X |
| 2,126,948 | 8/1938 | Dewhirst . | |
| 2,828,080 | 3/1958 | Rennels | 404/32 X |
| 3,022,712 | 2/1962 | Cousino et al. | 94/7 |
| 3,070,557 | 12/1962 | Gessler et al. | 404/17 |
| 3,253,521 | 5/1966 | Endres | 404/32 X |
| 3,324,213 | 6/1967 | Anfinset . | |
| 3,597,425 | 8/1971 | Shaines | 264/246 |
| 3,707,901 | 1/1973 | Bynum, Jr. et al. . | |
| 3,879,245 | 4/1975 | Fetherston et al. | 264/241 X |
| 3,894,686 | 7/1975 | Weinberg et al. | 238/8 |
| 3,915,581 | 10/1975 | Copp, Jr. | 404/32 |
| 4,160,761 | 7/1979 | Prusinski et al. | 260/42.47 |
| 4,244,841 | 1/1981 | Frankland | 260/2.3 |
| 4,289,273 | 9/1981 | Schmidt | 238/8 |
| 4,365,743 | 12/1982 | Trickel et al. | 238/8 |
| 4,480,074 | 10/1984 | Wang | 525/194 |
| 4,860,952 | 8/1989 | Schmidt | 238/8 |

FOREIGN PATENT DOCUMENTS

| | | |
|---|---|---|
| 2395353 | 1/1979 | France . |
| 2418299 | 9/1979 | France . |
| 2540193 | 3/1977 | Germany . |
| 2551345 | 5/1977 | Germany . |
| 2727644 | 12/1978 | Germany . |
| 8632856 U | 2/1987 | Germany . |
| 3707305 | 9/1988 | Germany . |
| 650541 | 7/1985 | Switzerland . |
| 225807 | of 1925 | United Kingdom . |
| 446059 | 8/1935 | United Kingdom . |
| WO8906670 | 7/1989 | WIPO . |

Primary Examiner—Ramon S. Britts
Assistant Examiner—James A. Lisehora
Attorney, Agent, or Firm—Brumbaugh, Graves, Donohue & Raymond

[57] ABSTRACT

Assemblies of resilient moldings are used as track crossings. A molding has a rubber surface layer which is bonded to a body formed from scrap rubber. In forming the molding, granular vulcanized rubber is mixed with a binder including crude rubber and a vulcanizing agent. The mixture is placed in a mold together with a crude rubber layer which also includes a vulcanizing agent. The molding is formed upon vulcanizing under heat and pressure.

26 Claims, 7 Drawing Sheets

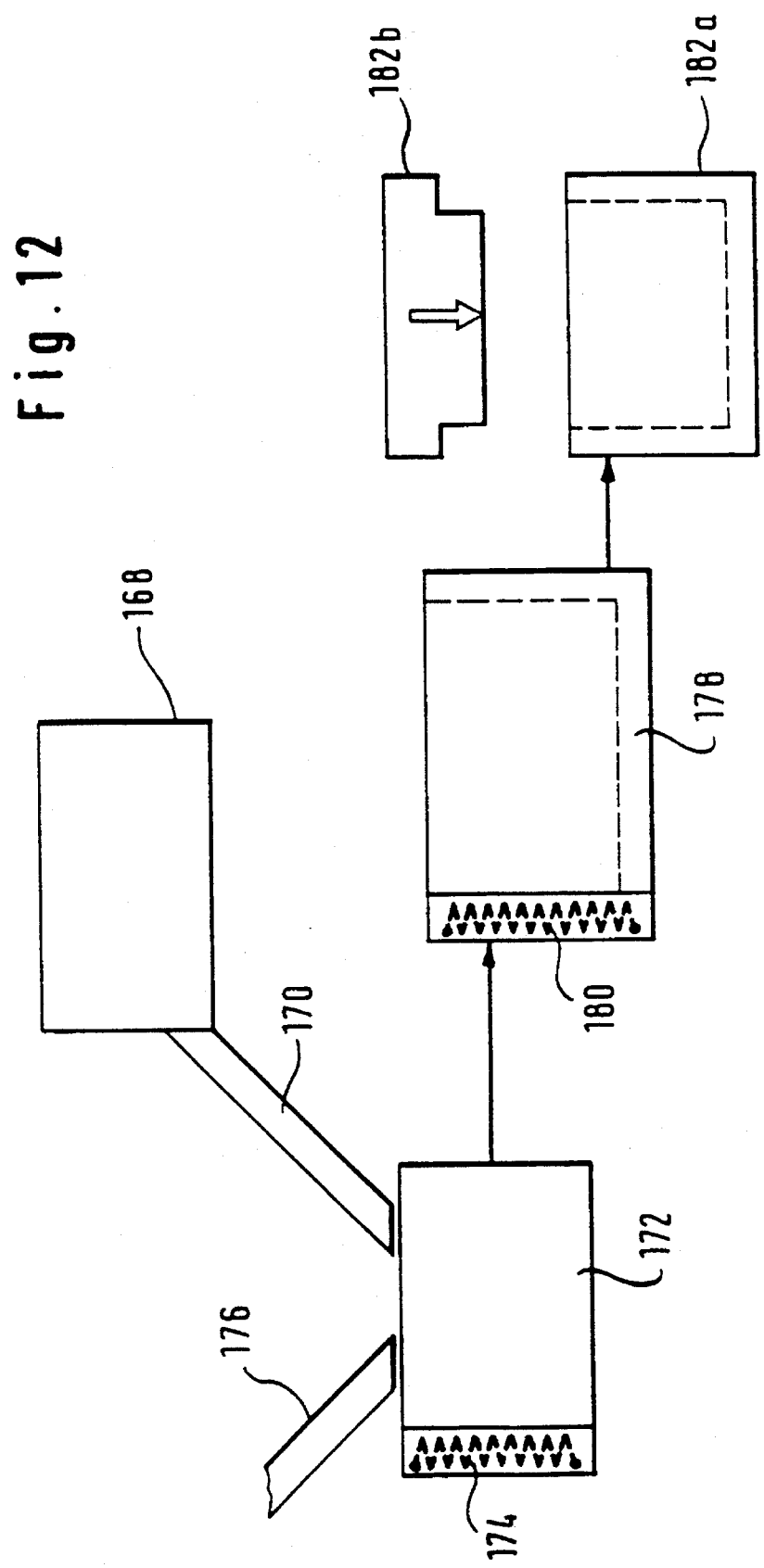

PROCESS FOR PRODUCING A RAILROAD CROSSING MEANS

This application is a continuation of application Ser. No. 07/938,135, now abandoned, filed on Oct. 7, 1992.

BACKGROUND OF THE INVENTION

The invention concerns a process for producing a railroad crossing means by forming molded members containing rubber and then laying the molded members over a track grating and/or ballast of a track system.

Such a railroad crossing means is disclosed in German Patent 2,727,644. In this known means a first group of molded platelike members serves to cover the surface region between two associated rails and a second group of molded platelike members serves to cover each of the surface regions outside the two rails. There the molded platelike members are laid on the ballast. The platelike members of the first group are designed to lock on to the railheads of the two rails. They are compressed, under elastic deformation, in transverse direction to the rails, after which they are slipped under the railhead of one rail and then also snap in under the railhead of the other rail in every instance. The molded platelike members of the other group are slipped in under the railhead of the associated rail in every instance and fixed along their edge distant from the rail by the adjoining bed of a roadway.

The molded platelike members disclosed in German Patent 2,727,644 are employed especially for railroad crossings which are to be used by vehicles carrying heavy loads.

German Letters of Disclosure 3,707,305 disclose a railroad crossing means of the type described at the beginning wherein the molded platelike members are designed with a small plate thickness. These plates are used when the railroad crossings are intended only for pedestrian traffic and light-weight vehicles.

Both accomplishments have proved their worth in practice. However, production of railroad crossings of rubber-based molded members has hitherto turned out to be relatively costly.

U.S. Pat. No. 3,894,686 in addition discloses a process for producing a railroad crossing means wherein molded members are formed in situ in two superimposed layers, specifically, between the two adjacent rails as well as outside both rails, on top of the track grating and the ballast filled in between the ties of the track grating. Here a hardenable base-layer composition is poured in situ in a first layer. This hardenable base-layer composition is prepared as a mixture of comminuted rubber scrap and a hardenable resin. The consistency of the base-layer composition is adjusted so that part of the base-layer composition moistens the ties 24 and the ballast and at the same time flows in between at least some of the individual particles of the ballast and forms an essentially continuous cohesive network of liquid intermixed with air. After thorough hardening of the base layer, the liquid network forms elastic bridges between individual particles of the ballast which stabilize the ballast and hold it together. An elastic wear layer, specifically, of a wear-layer composition, is poured on top of the base so formed. A mixture of finely divided rubber and hardenable resin is used as the wear-layer composition. This wear-layer composition may be similar to or different from the base-layer composition, as long as the coefficients of thermal expansion of the base layer and of the wear layer remain compatible with one another. There the necessary recesses for the rail flanges of the wheels traveling on the rails are formed upon pouring, in that complementary molded members are laid on the inner sides of the rails before the wear layer is poured. After the wear layer is thoroughly hardened, a smooth roadway surface is available.

In this known method, at least the base layer may consist of scrap rubber granules. However, this known method is unsatisfactory from the point of view of performance of the process. When the layers, i.e., the base layer and the wear layer, are poured in situ on the track system, the pouring process and the hardening process on the track system lead to lengthy periods of interruption during which rail traffic on the track system must be discontinued. This may be acceptable when the railroad crossing means is constructed in the course of laying a new track system. However, it is unacceptable when a railroad crossing means is to be newly installed later or is to be repaired in an existing track system.

SUMMARY OF THE INVENTION

The object of the invention is to indicate a process for producing a railroad crossing means of generic type which can be performed economically but at the same time retains the advantages of subsequent laying of molded members obtained outside the track system.

To accomplish this object, a first procedure is proposed which provides that the molded members, in their core region, are produced with the use of granular vulcanized scrap rubber and with an essentially closed covering skin on at least one traffic-loaded face, in such a way that a mold is at least partially lined with a crude rubber layer containing a vulcanizing agent, in that the remaining volume of the mold is thereupon filled with a mixture of granular vulcanized scrap rubber and a binder, and in that the crude rubber layer is then vulcanized under heat and pressure, producing a bond with the mixture, and the binder is allowed to harden.

In addition, a second procedure according to the invention is proposed which provides that the molded members are produced with the use of granular vulcanized scrap rubber in such a way that a mixture of granular vulcanized scrap rubber and thermoplasticized binder in a semiplastic state is introduced into a mold which is set to a high temperature lying below the softening point of the thermoplasticized binder, that this mixture is distributed under pressure within the mold, and in that the molded members thus obtained, after cooling to a temperature below the softening point of the thermoplasticized binder, are removed from the mold and then additionally cooled.

Granular vulcanized scrap rubber can be prepared relatively cheaply by comminuting used rubber scrap. Used rubber scrap is abundantly available, being obtained for example in the retreading of automobile tires. In such retreading the tires are stripped of their rubber treads. These rubber treads may be ground in a so-called shredder or in a mill to any desired particle size. The shredded material proves to be suitable for producing the molded members required for railroad crossings. In addition, vulcanized rubber scrap is likewise obtained in abundant quantity in rubber-processing operations, in the form of production wastes. Because the granular vulcanized rubber scrap is bound by means of a binder, molded members are obtained which, in their properties of elasticity, are at least equal, for use in railroad crossing means, to conventional molded members that have been made entirely from crude rubber. Selection of the appropriate binder makes it possible to vary the properties of elasticity to suit the requirements of practice.

The molded members produced according to the invention may be formed in a variety of shapes. Thus, molded members of the abovementioned first group and of the abovementioned second group may be produced in great plate thickness for railroad crossings designed to be used by heavy vehicles. However, molded members of the first and second groups which have a small plate thickness and are designed particularly for railroad crossings to be used by pedestrians and by lighter vehicles may alternatively be produced. In addition, molded members of a third group, which perform an auxiliary function in that, on the one hand, they are fitted to the rail fastening means by which the rails are fastened to the ties supporting them and, on the other, center and partially support the molded members of the abovementioned first group, may alternatively be produced.

It has been found that molded members produced using granular vulcanized scrap rubber perform their function in railroad crossing means especially well when the granular vulcanized scrap rubber is bound by the hardened binder into an elastic compound which is essentially incompressible in volume, i.e., into a compound which is substantially free of inner air spaces.

Especially favorable properties of elasticity and durability of the molded members and/or the core region are obtained when an individual granule or group of granules of the scrap rubber is formed by the binder in the essentially completely enclosing matrix.

To impart to the surface of the molded member properties which are as favorable as possible with respect to suitability for pedestrian and vehicular traffic and durability, it is additionally proposed that the molded member have, on at least one traffic-loaded face, an essentially closed covering skin of a vulcanized crude rubber mixture that is joined with the core region.

For properties of durability, it is in addition favorable when the molded member is essentially completely enclosed by the covering skin, in particular because then the covering skin, owing to total enclosure of the core region, is given adhesion by total mold enclosure, in addition to adhesion to the core region provided by the material.

A variety of binders which combine with vulcanized scrap rubber may be used for binding together the particles of granular vulcanized scrap rubber. An unvulcanized crude rubber mixture which can be vulcanized by conventional rubber-processing methods is preferably used as a binder. Conventional auxiliary products and vulcanizing aids, in particular sulfur, are added to this unvulcanized crude rubber mixture so that vulcanization can be carried out in the usual way under heat and pressure.

Bonding of the covering skin with the material of the core region likewise is preferably effected by vulcanization. Especially good adhesion of the covering skin to the core region is obtained when the covering skin and the binder consist of the same or a similar crude rubber mixture and are hardened and joined together by vulcanization. At the same time, opportunities for variation still exist in selection of the crude rubber mixture for forming the covering skin, on the one hand, and for binding the granular vulcanized scrap rubber, on the other: The crude rubber mixture for the covering skin will be selected especially from the viewpoint of properties suitable for pedestrian and vehicular traffic, and the crude rubber mixture for binding granular vulcanized scrap rubber especially from the viewpoint of optimal cohesion of scrap rubber particles and optimal properties of elasticity of the molded member as a whole.

The wall of the covering skin may have a thickness of 1 mm to 10 mm on a traffic-loaded face of the molded member; the skin thickness is preferably about 5 mm.

If the granular vulcanized scrap rubber is mixed with vulcanizable crude rubber and a covering skin is provided, relatively coarse particles may be used for the core region. The largest particles present within the particle size distribution to be used may then have a dimension of 5 mm to 8 mm, the largest particles present preferably having a dimension of about 7 mm. In any case it is desirable that, in addition to the largest particle specified above, smaller and very small particles likewise be present, so that the cavities within the mass of particles are closed up with as little use of binder as possible.

The percentage by weight of scrap rubber in the core region may be between 70% and 90% of the total weight of scrap rubber and binder in the core region, and is preferably about 85% by weight. It can be seen from these figures that the molded member may consist in large part of scrap rubber, which results in very economical fabrication.

The binder may in principle alternatively be made of a thermoplastic synthetic material, in particular of thermoplastic scrap material. Thermoplastic scrap material is obtained in large quantities from, for example, film manufacture and film processing. This film scrap is eminently suitable as a binder for binding granular vulcanized scrap rubber. Those thermoplastics which are elastic, such as, for example, polyolefin-based thermoplastics, are especially suitable.

When thermoplastic synthetic material is used as a binder, a material is employed in which the largest particles present have a dimension of 1 mm to 3 mm, preferably about 2 mm. The percent by weight of granular vulcanized scrap rubber then amounts to about 40% to 60%, preferably about 50%, while the percent by weight of the thermoplastic binder is about 60% to 40%, preferably about 50%. In principle, it is alternatively possible, when a thermoplastic binder is used, to provide a closed covering skin at least on traffic-loaded faces. However, it has been found that, even without a covering skin, properties sufficiently suitable for pedestrian and vehicular traffic are obtained on the surface because of the presence of vulcanized scrap rubber particles.

When properties suitable for pedestrian and vehicular traffic are the primary concern, it may be added that an essential point in connection with such properties is slipping and skidding behavior, specifically, in the dry as well as the wet state. This slipping/skidding behavior may be favorably influenced by providing traffic-loaded surface regions with surface profiling, for example, a diamond pattern. In addition, the slipping/skidding properties of traffic-loaded surface regions may alternatively be favorably influenced by equipping such surface regions with nails or spikes.

The molded member may be designed with weight-reducing cavities in a volumetric region distant from its traffic-loaded surface, for example, on its surface lying on the track grating or the ballast. These weight-reducing cavities lead not only to further improvement in economy, but in addition to reduced weight as well, which facilitates the handling of large-area plates or, expressed in another way, permits production of larger molded members, without limiting handling.

As a general rule, it may be stated that molded members having a covering skin and vulcanized crude rubber as a binder between. scrap rubber particles are used preferably for molded members directly exposed to traffic on railroad crossings which are designed for heavy traffic. On the other hand, molded members produced with thermoplastic binders are preferably employed for railroad crossings used chiefly by pedestrians and light vehicles.

Those molded members which are provided for fitting to rail-fastening structures and for centering molded members directly exposed to traffic are likewise preferably produced with the use of thermoplastic binders.

The process according to the invention is suitable especially when granular scrap rubber is bound with crude rubber as binder. The crude rubber layers forming the covering skin are placed in the mold in putty-like consistency.

To obtain uniform vulcanization in the covering skin as well as in the crude rubber used as binder of the scrap rubber granules in the case of great plate thickness, it is recommended that the mixture of granular vulcanized scrap rubber and vulcanizable crude rubber be introduced at a temperature substantially sufficient for the vulcanization of crude rubber, so that only the heat still necessary for vulcanization of the crude rubber layers forming the covering skin need be supplied through the walls of the mold.

If it is desired to obtain a molded member enclosed by covering skin on all sides, a bottom-mold half may be lined with a layer of crude rubber containing a vulcanizing agent, the bottom-mold half so lined filled with a mixture of granular vulcanized scrap rubber, the top of the mixture covered by another layer of crude rubber containing vulcanizing agent, and then a top-mold half allowed to act with pressure on the contents of the bottom-mold half. Then the bond of the additional layer placed on the top with the layers lining the mold can be improved by overlapping.

The granular vulcanized scrap rubber and the binder may be mixed together in, for example, a screw mixer. Depending upon the mixing temperature employed, this allows the granules of the scrap rubber to be enclosed by the binder. It can be seen that good distribution of the binder within the compound of vulcanized scrap rubber granules is thereby provided.

To produce a molded member with a thermoplastic binder, a mixture of granular vulcanized scrap rubber and a thermoplasticized binder in a semiplastic state may be placed in a mold. There the mold, even before insertion of the mixture, is set to a high temperature just below the softening point of the thermoplasticized binder. This ensures that shock cooling of the thermoplastic binder, which might lead to worsened physical properties of the molded members, does not take place when the mixture is introduced. The mixture is then distributed in the mold under pressure and is cooled by contact with the mold walls. After cooling to below the softening point of the thermoplasticized binder, the molded member may be removed from the mold and additionally cooled outside the mold.

The mixture of granular vulcanized scrap rubber and thermoplastic binder may be prepared by comminuting thermoplastic film in a cutting machine with heating by the mechanical cutting energy supplied, admixing the comminuted chopped stock with the granular vulcanized scrap rubber and mixing the mixture obtained in a screw mixer.

It is in any case advisable to place each mixture of scrap rubber and binder, in the production stage of mixing, in an intermediate receptacle which is set to an optimal temperature, and then to pour each mixture in only when the intermediate receptacle contains sufficient mixture to fill the respective mold all at one time. In this way the properties of homogeneity of the molded member are improved.

BRIEF DESCRIPTION OF THE DRAWINGS

The invention is explained by means of an example illustrated in the accompanying figures, wherein.

DETAILED DESCRIPTION OF PREFERRED EMBODIMENTS

Figure 1:
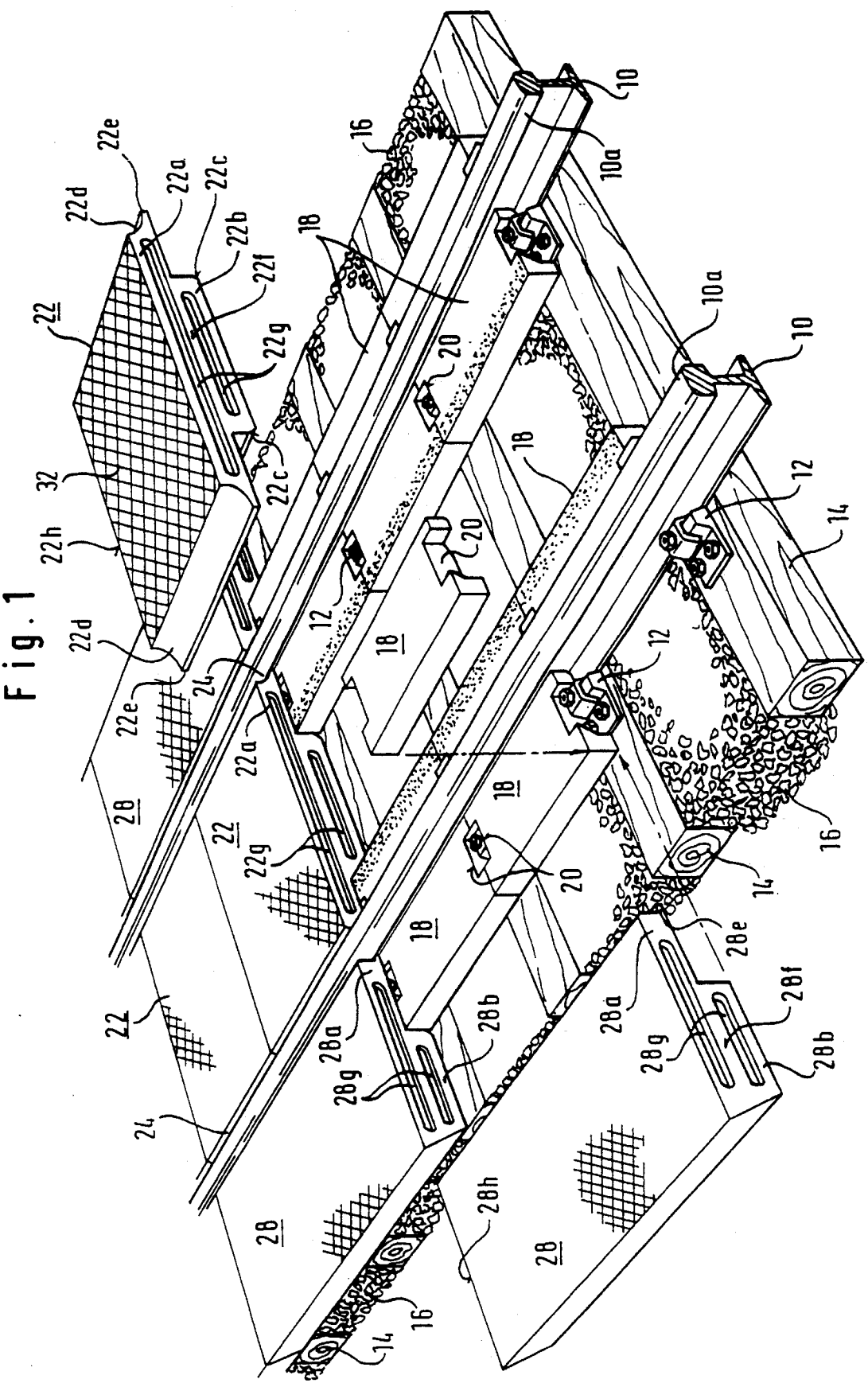
FIG. 1 represents a railroad crossing means according to a first embodiment.

In FIG. 1 the two rails of a track system are labeled 10. These rails 10 are laid on ties 14 by clamping devices 12. The ties 14 are laid in a bed of gravel 16, which in each instance is compacted between two successive ties by tamping. The rails 10 and the ties 14 form a track grating. The ballast 16 lies approximately flush with the upper surfaces of the ties 14.

Figure 7:
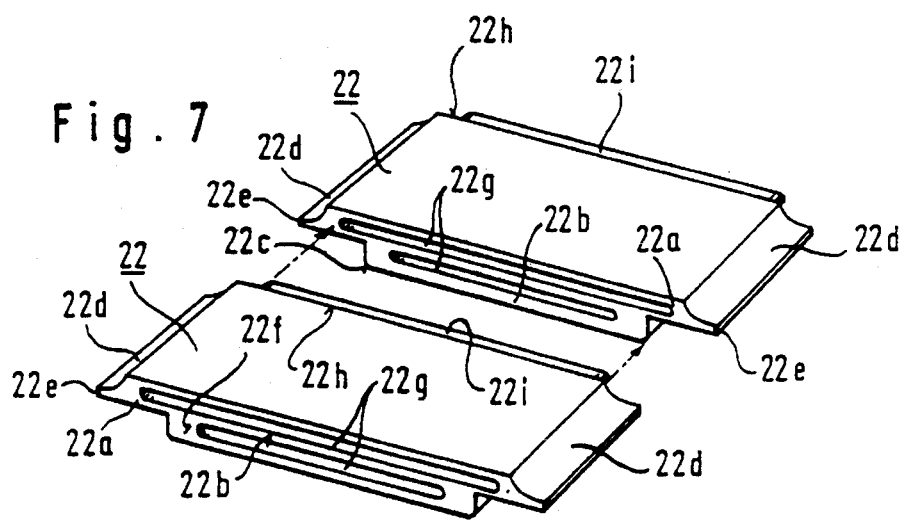
FIG. 7, the assembly of successive center plates in the longitudinal direction of the rails.

So-called rail fittings 18 are laid on the ties on either side of each rail 10. These rail fittings each have a half recess 20 at both ends. The half recesses 20 are sized so that there is room in each instance for a clamping device 12 between the two half recesses of two successive rail fittings 18. Center plates 22 lie on the rail fittings 18 between the two rails 10. These center plates have an essentially T-shaped cross section with a transverse leg 22a and a center leg 22b. The center legs 22b fit between the rail forms 18 and are beveled at 22c so that they can easily be slipped in between the rail fittings 18 opposite one another. The transverse leg 22a is sloped or chamfered on its longitudinal edges at 22d so that projections 22e are formed which, lying on the rail fittings 18, engage under the railheads 10a. At the same time clearances 24 are formed, at least on the inner sides of the rails, for the flanges of the leading wheels (not illustrated). Each of the center plates 22 is provided with grooves 22g at an end surface 22f and with complementary ribs at the opposite end surface 22h, as illustrated in detail in FIG. 7. The ribs are labeled 22i. The center legs 22b lie on the ballast.

Figure 3:
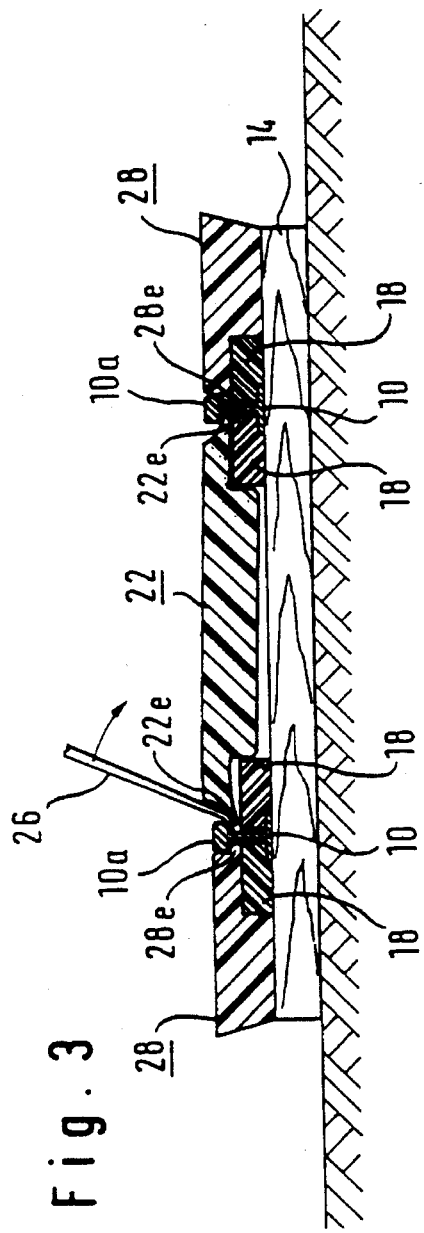
FIG. 3, a section along line III—III of FIG. 2 upon insertion of center plates between two rails.

Insertion of the center plates 22 is effected in such a way that first the projections 22e on one longitudinal side at a time are slipped in under the associated railheads 10a, and that then, by means of a mounting iron 26, the projections 22e on the other longitudinal side are squeezed in under the associated railheads 10a, as illustrated in FIG. 3. When this squeezing is completed the center plates 22 assume the position shown in FIG. 4. Then successive center plates 22 can be pushed together in the longitudinal direction of the rails, so that each rib 22i of a center plate 22 is forced into the groove 22g of the next following center plate and a virtually smooth and tight connection is produced between successive center plates. The center plates then lie between the two rails substantially without restraint, but are secured against lifting from the track grating by the railheads 10a. The undersides of the center leg 22b lie on the ties 14 and the ballast 16. Successive center plates 22 may be pushed together by means of band irons, which are placed on the underside of the center plates 22, on the ties 14. On these band irons a support block is applied at one end in each instance and a power tool is applied at the other end in each instance, so that actuation of the power tool causes the center plates to press against one another in the longitudinal direction of the rails 10.

Additionally provided are outer plates 28, which likewise have projections 28e for gripping under the railheads 10a and have an essentially L-shaped form with a horizontal leg 28a, which is designed to rest on the rail fittings 18, and a vertical leg 28b, which is designed for to rest on the ties 14 and the ballast 16. The outer plates 28 in turn are designed with grooves 28g on each end surface 28f and with matching ribs 28i on each opposite end surface 28h (see FIG. 2), so that they can be pushed together just like the center plates.

To facilitate assembly, the upper sides of the rail fittings 18 are made slidable with soft soap before the center plates 22 and the outer plates 28 are laid.

Figure 4:
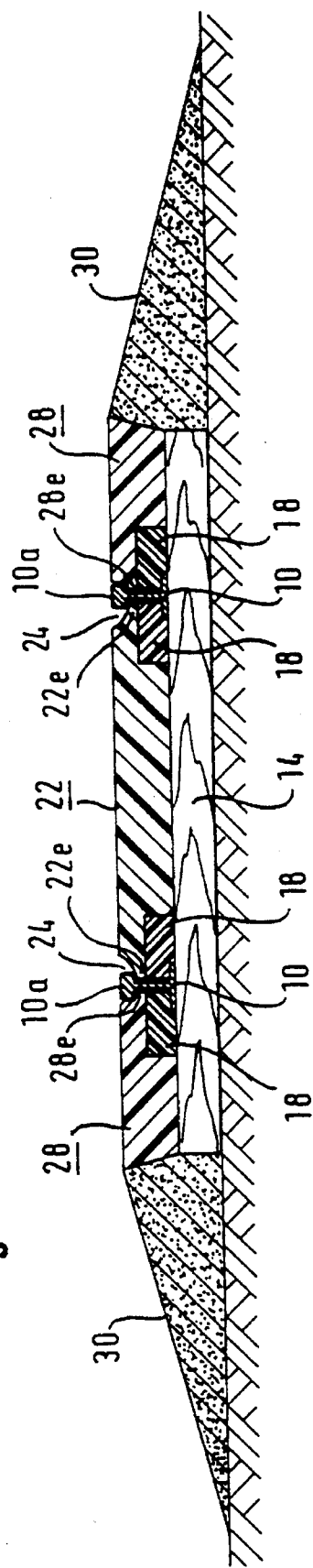
FIG. 4, a section corresponding to that of FIG. 3 after completion of adjacent roadway-paving sections.

As can be seen in FIG. 4, the outer plates 28 are held in position by adjoining roadway sections 30.

Figure 5:
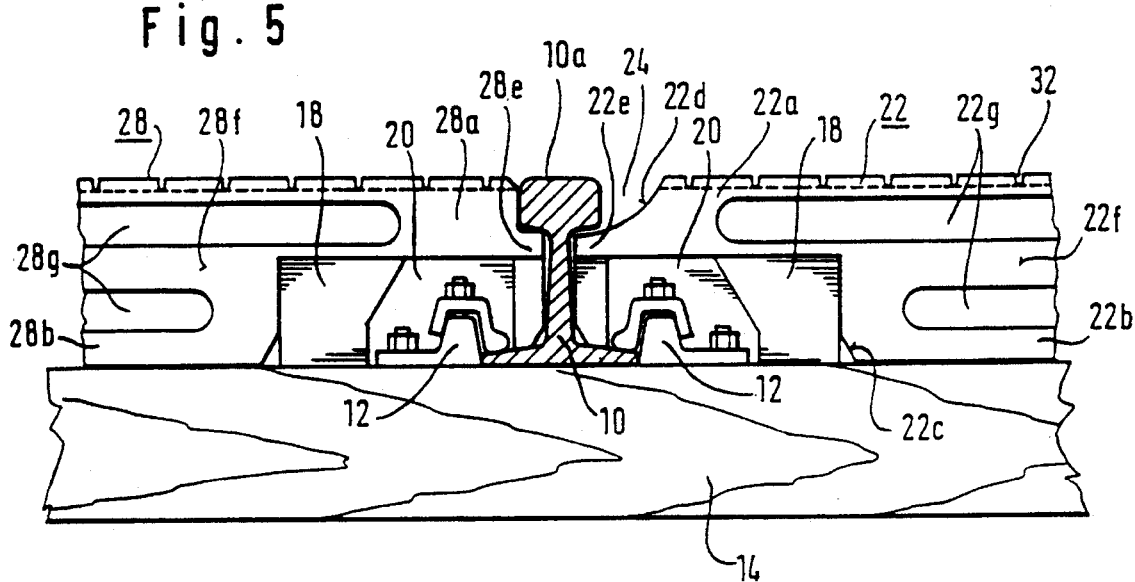
FIG. 5, a view of a joint between successive plates in the longitudinal direction of the rails.

In FIG. 5 a joint can be seen between successive center plates 22 and outer plates 28.

FIGS. 1 and 5 show that the top faces of the center plates and outer plates exposed to traffic are provided with a diamond-shaped profiling 32.

Figure 2:
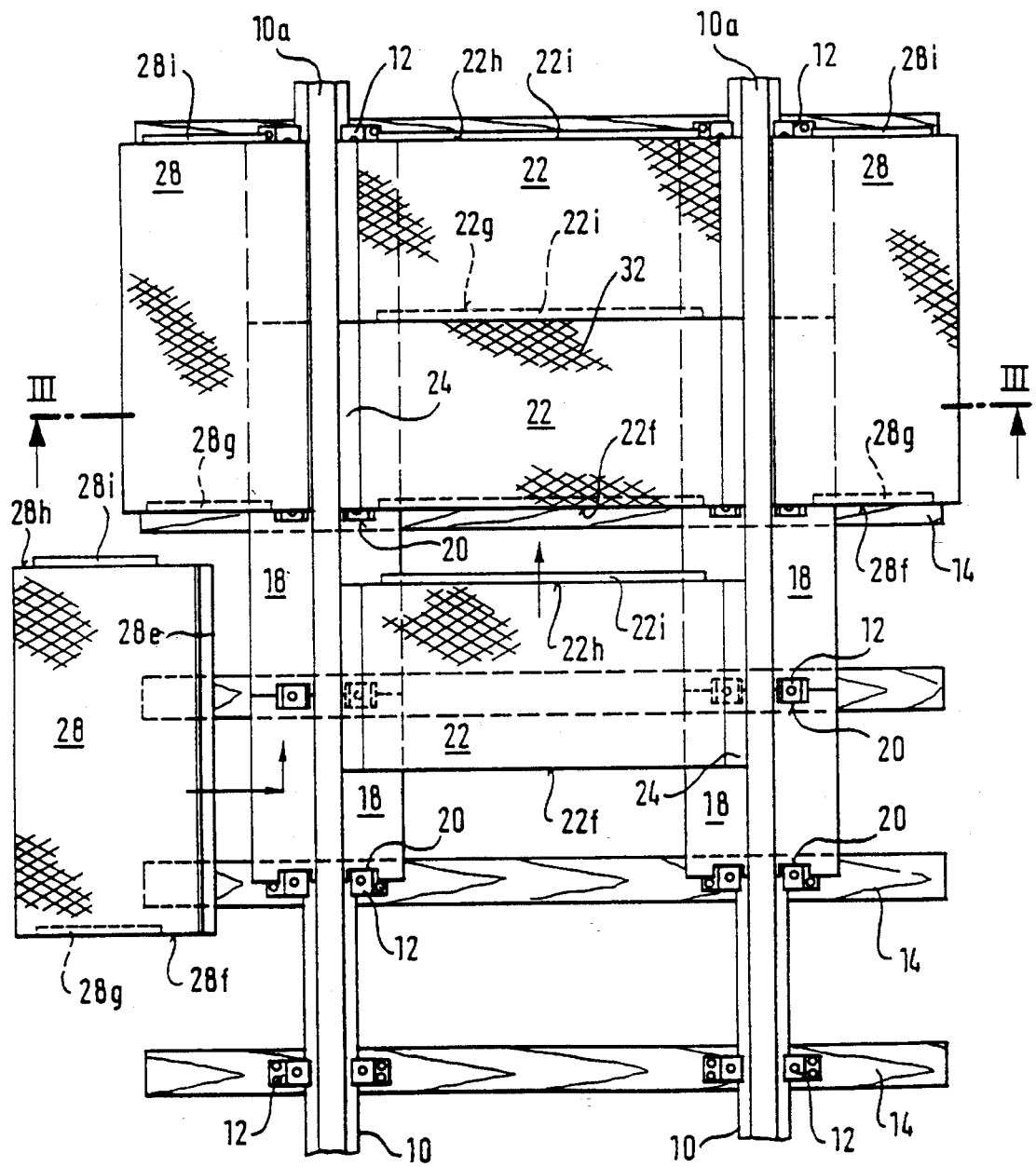
FIG. 2, a top view of FIG. 1.
Figure 6:
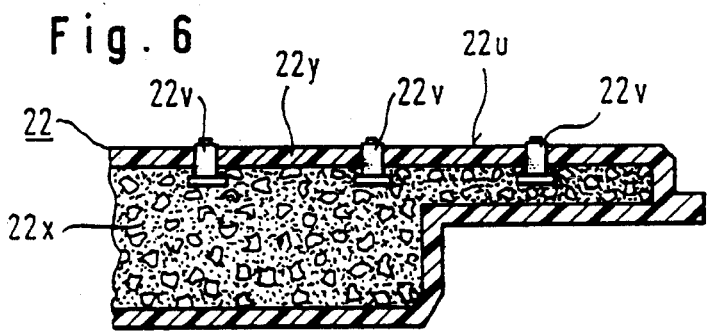
FIG. 6, a section through a plate with covering skin.

FIG. 6 shows a cross section through a center plate 22, which is taken roughly along line III—III of FIG. 2. This center plate consists of a core region 22x and a covering skin 22y. There the core region 22x is made of a granular scrap rubber, the granules being bound to one another by vulcanized crude rubber. The covering skin 22y likewise consists of vulcanized crude rubber. The covering skin 22y is vulcanized together with the core region 22x. Spikes or nails 22v, which may project over the traffic-carrying surface 22u or in any case end so near the surface 22u that they become effective upon pressure loading of the traffic-carrying surface 22u, are provided near the said surface 22u. Depending upon the thickness of the covering skin 22y, the spikes or nails 22v may alternatively be anchored exclusively in the covering skin. In FIG. 6 it is provided that the spikes or nails may alternatively be anchored in the core region 22x.

Figure 10:
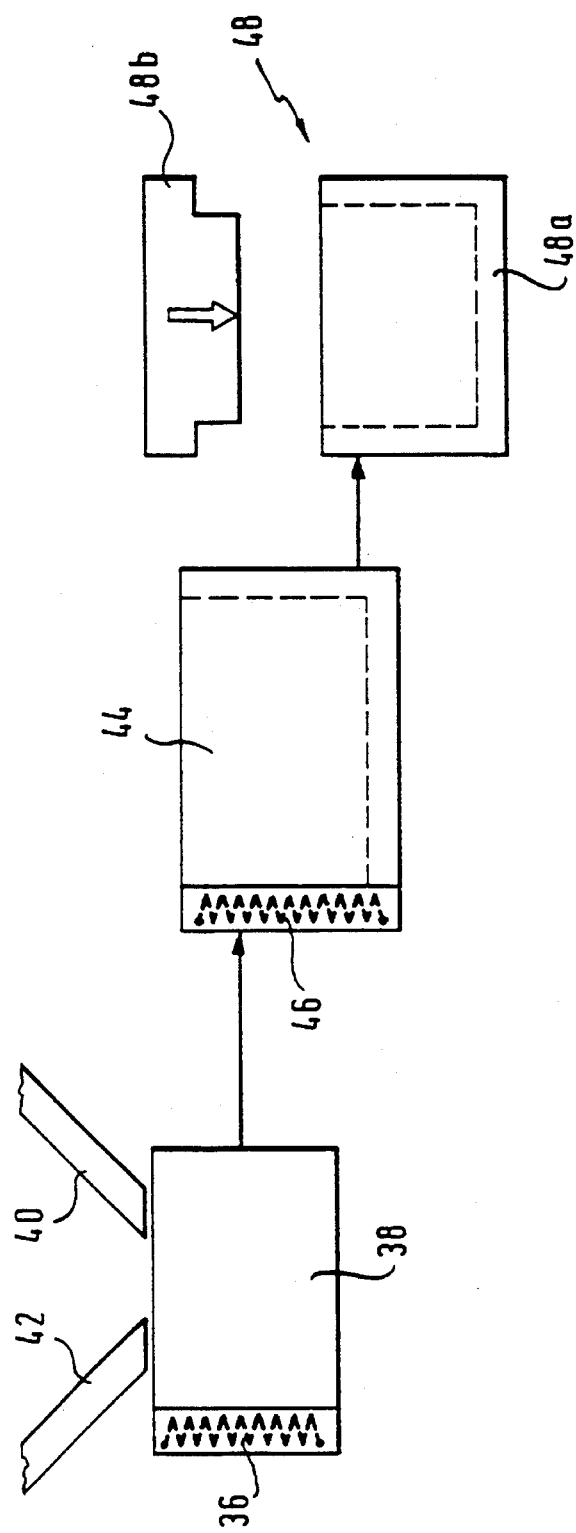
FIG. 10, the diagram of a system for producing molded members having a covering skin.

Production of a center plate, as illustrated in FIG. 6, may be effected as described below with the aid of FIGS. 10 and 11.

Granular scrap rubber, which has been obtained by comminution of tire tread scrap and has a particle size distribution whose largest particles have a maximum linear dimension of approx. 7 mm, is put by a feeding device 40 into a mixer 38, for instance a screw mixer, equipped with a heating device 36. At the same time vulcanizable crude rubber in, for example, granular form, is supplied to the mixer 38 by an additional feeding device 42. Vulcanizing agents, such as sulfur, and processing aids have already been added to the crude rubber. The vulcanizing agent and the processing aids alternatively may be supplied to the mixer separately. The mixture contained in the mixer has a temperature which is already sufficient to later cause vulcanization upon application of suitable pressure. This hot mixture is continuously supplied to an insulated receptacle 44, which may be equipped with a heating device 46. The temperature of the mixture in the insulated receptacle is maintained or optionally is further increased. As soon as the insulated receptacle contains a quantity of mixed stock sufficient for the center plate to be formed each time, the contents of the receptacle are transferred to a mold 48, for example by tipping the insulated receptacle 44.

Figure 11:
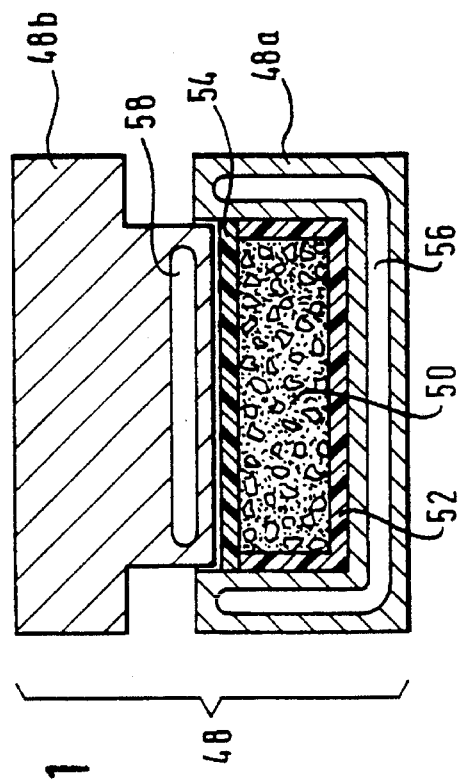
FIG. 11, the section through a vulcanizing mold for producing molded members having a covering skin and FIG. 12, a system for producing molded members with a thermoplastic binder and without a covering skin.

The mold 48 is illustrated in detail in FIG. 11; it consists of a bottom-mold half 48a and a top-mold half 48b. Before introduction of the mixture 50 the bottom-mold half 48a is lined with a layer 52 of vulcanizable crude rubber. This vulcanizable crude rubber already contains the necessary vulcanizing agent and processing aids; for example, the layer material has a putty-like consistency, so that it can easily be laid on the inner walls of the bottom-mold half 48a. The mixture 50 is then poured from the insulated receptacle 44 into the trough formed by the layer material 52. Then an additional layer 54 of vulcanizable crude rubber is spread over the mixture 50. The layer 54 is added close to the layer 52, optionally with overlap in such a way, for instance, that the upper edges of the layer 52 are folded over the layer 54. Then the top-mold half 48b is pressed against the bottom-mold half 48a. The bottom-mold half 48a is equipped with a heating device 56. An additional heating device 58 is provided in the top-mold half 48b. The crude rubber portion of the mixture 50, as well as the crude rubber of the layers 52 and 54, is now vulcanized in the mold 48. There the heat that has-been introduced into the bottom-mold half 48a with the mixture is available for vulcanization of the mixture 50, while the vulcanizing heat for the layers 52 and 54 is transferred from the heating devices 56 and 58 through the walls limiting the mold cavity. Vulcanization of the mixture 50 results in a matrix of vulcanized crude rubber in which the granules of the already previously vulcanized scrap rubber are enclosed individually or in groups. The layers 52 and 54 are likewise vulcanized and as a result of vulcanization enter into an adhesive composition of matter with the mixture. In this way the mixture 50 results in the core region 22x of FIG. 6 and the crude rubber layers 52 and 54 result in the covering skin 22y of FIG. 6. The spikes or nails 22v may already be set in the layers 52 and 54, so that they are included in the vulcanizing process. However, it is alternatively possible to enclose the spikes or nails in the molded members subsequently, per FIG. 6.

After completion of the vulcanizing process the molded member may be removed from the mold 48 and cooled. It is then ready for use.

Figure 8:
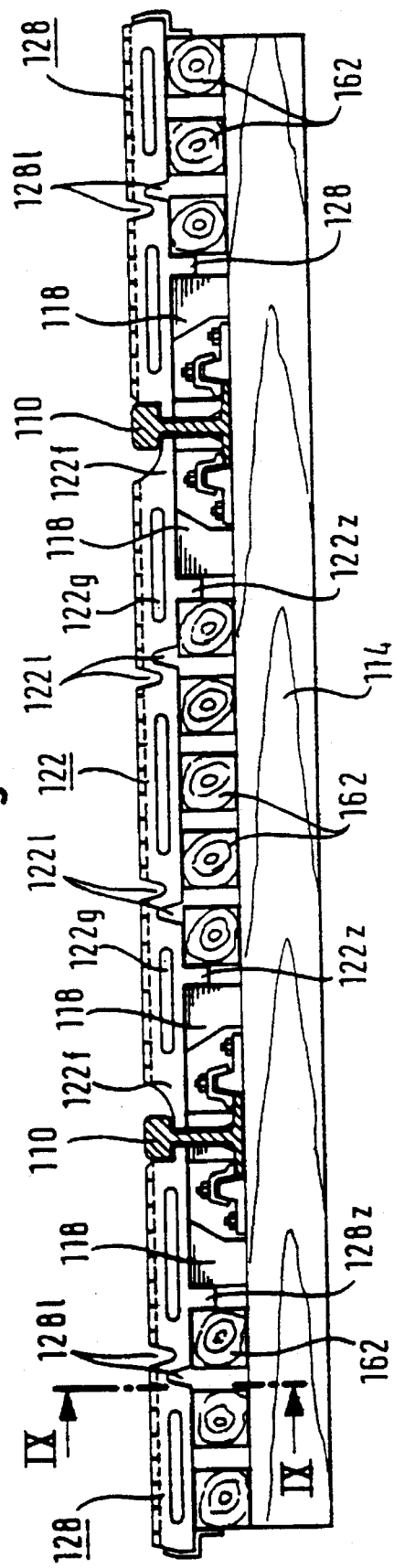
FIG. 8, a section through a second embodiment of a railroad crossing means.
Figure 9:
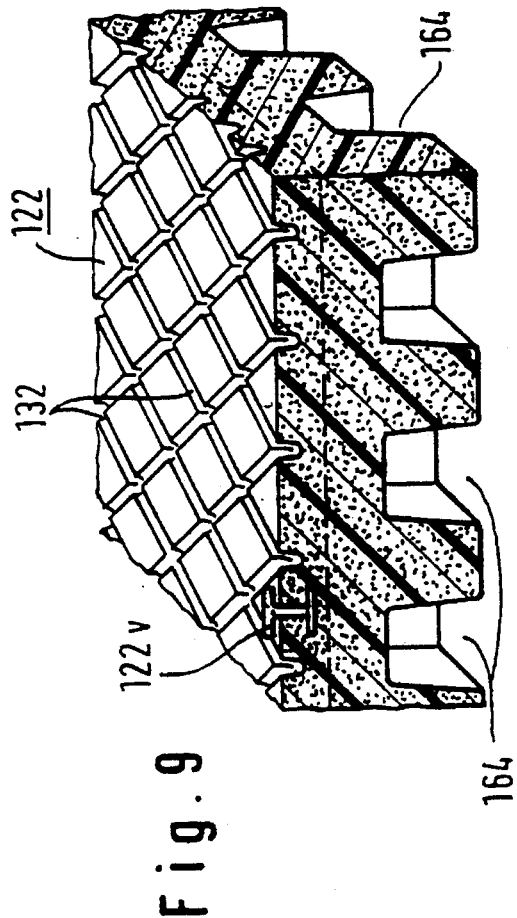
FIG. 9, a section along line IX—IX of FIG. 8.

Another embodiment of a railroad crossing means is illustrated in FIGS. 8 and 9. In this embodiment the center plates 122 are designed with a smaller plate thickness than in the embodiment of FIGS. 1–7. The center plates 122 lie on longitudinal timbers 162, which in turn are laid on ties 114. The outer plates 128 likewise lie on longitudinal timbers 162. The traffic-loaded surfaces of the center plates 122 are provided with a diamond pattern 132 and are equipped with nails or spikes 122v. Here too, the end faces 122f are provided with grooves 122g, whose ribs in each instance match the opposite end faces, not illustrated. Engagement of the center plates 122 and the outer plates 128 in the rails 110 is the same as in FIG. 1. Here too, rail fittings 118, which are designed similar or identical to those of FIG. 1, lie in the region of the rails. The center plates 122 and the outer plates 128 are constructed with centering strips 122z and 128z respectively, which rest against the rail fittings 118. The center plates 122 and the outer plates 128 are designed with longitudinal grooves 1221 and 1281 respectively, which relieve thermal expansion and in addition facilitate installation of the center plates 122 by the method of FIG. 3. Recesses 164, which result in a reduction of weight, may be provided on the underside of the plates 122 and of the outer plates 128.

The embodiment of FIGS. 8 and 9 is lower in production costs than the embodiment of FIGS. 1–7, because the plates 122 and 128 require less material. The consumption of material for the longitudinal timbers 162 there is less than the consumption of material for the thicker plates. The embodiment of FIGS. 8 and 9 is designed in particular for railroad crossing means which are used only by pedestrians and light vehicles.

The recesses 164 of FIG. 9 may alternatively be used in the plates of FIGS. 1–7.

The plates 122 and 128 of FIGS. 8 and 9 consist of a granular scrap rubber having a particle size distribution whose largest particles lie in the order of magnitude of 1–2 mm linear dimension. These particles are bound in a cohesive thermoplastic compound. Here a covering skin is unnecessary. The small size of the particles here provides that essentially closed surfaces are obtained, where any scrap rubber granules emerging through the surface improve surface structure in the sense of reduced skidding. Production of the center plates 122 and 128 is effected as illustrated schematically in FIG. 12.

In FIG. 12 a cutting device, in which thermoplastic waste films are processed into cut stock with application of heat, is labeled 168. The cut film particles, have a maximum linear dimension of about 15 mm. The cut stock is heated by the mechanical energy of the cutting process. The heated cut stock is fed to a screw mixer 172, which may likewise be equipped with a heating device 174, through a feed 170. Granular vulcanized scrap rubber is fed to the screw mixer 172 through an additional feed 176. The particle size distribution of the vulcanized scrap rubber is such that the largest particles occurring have a linear dimension of about 1–2 mm. The mixing ratio of thermoplastic waste film and vulcanized scrap rubber granules is approximately 50:50 percent by weight. The thermoplastic scrap film consists, for example, of polyethylene. A temperature which exceeds the plasticizing point of the respective thermoplastic material is reached in the screw mixer 172. From the screw mixer 172 the mixed material goes to an insulated receptacle 178, which in turn may be equipped with a heating device 180. When the insulated receptacle 178 contains sufficient mixed stock to fill a mold for producing, for example, a center plate 122, the mixed stock is poured into a bottom-mold half 182a and then compressed by a top-mold half 182b. Upon filling of the mold 182 with the mixed stock it has a temperature that lies just below the softening point of the thermoplastic film material. A matrix of thermoplastic material, wherein the granules of vulcanized scrap rubber are enclosed individually or in groups, is formed in the mold by compression of the mixed stock, which at first is still heated above the thermoplastic softening point. The temperature of the mold 182a, 182b, just below the softening point, prevents shock cooling. Then slow cooling takes place in the mold 182a, 182b. As soon as cooling of the mixed stock has proceeded so far that a stable molded member is produced, the latter is removed from the mold and cooled further. The cooled molded member is ready for use in a railroad crossing means.

Here the nails or spikes may be enclosed in the finished molded member. However, it is alternatively possible to preposition the nails or spikes on the mold wall forming the surface exposed to pedestrian or vehicular traffic and then embed them in the molded member when the latter is molded.

The process according to FIG. 12 is especially suitable for producing the rail fittings 18 of FIG. 1 and in addition for producing the rail fittings 118, as well as the center and outer plates 122 and 128 of FIG. 8. In principle, however, it is alternatively possible to produce the center plates 22 and the outer plates 28 of FIG. 1 by the process of FIG. 12; the center plates 22 and the outer plates 28 of FIG. 1 are preferably produced by the process of FIGS. 10 and 11. Conversely, however, it is alternatively possible to produce the center plates 22 and the outer plates 28 of FIG. 1 by the process of FIG. 12.

I claim:

1. A process for forming a molded member for a railroad track crossing, comprising:

providing a mold for forming the molded member, the mold having a bottom part and a top part, both of which are substantially impermeable to the materials from which the molded member is to be formed, the bottom part having a cavity with a top opening and the top part being receivable into the cavity through the top opening, preparing a heated mixture comprising granular vulcanized scrap rubber and a binder comprising crude rubber and a vulcanizing agent;

preparing a molded-member precursor in the cavity of the bottom part of the mold, the molded-member precursor comprising as one part thereof the heated mixture and as a further part thereof at least one cohesive layer adjoining the heated mixture and interposed between the heated mixture and a surface of one of the mold parts, the cohesive layer comprising crude rubber and a vulcanizing agent and having a putty-like consistency;

inserting the top part of the mold into the cavity of the bottom part of the mold through the top opening and applying a force to the top part to apply pressure to the molded member precursor while maintaining the molded-member precursor at an elevated temperature to vulcanize the crude rubber, to bond the heated mixture, and to form a bond between the heated mixture and the cohesive layer, thereby forming the molded member from the molded-member precursor; and allowing the molded member to cool.

2. The process of claim 1, wherein forming the molded-member precursor comprises lining at least a portion of the mold with said cohesive layer.

3. The process of claim 2, wherein the portion comprises a bottom surface of the mold.

4. The process of claim 1, wherein forming the molded-member precursor comprises placing said cohesive layer over the heated mixture in the mold.

5. The process of claim 1, wherein forming the molded-member precursor comprises substantially complete enclosure of the mixture with the at-least-one layer.

6. The process of claim 1, wherein the heated mixture of vulcanized scrap rubber and a binder is elastic and essentially incompressible.

7. The process of claim 1, wherein the binder forms a matrix for individual or groups of scrap rubber granules.

8. The process of claim 1, wherein the crude rubber in the mixture and in the layer are alike.

9. The process of claim 1, wherein the cohesive layer has a thickness in a range from 1 to 10 mm.

10. The process of claim 9, wherein the cohesive layer has a thickness of about 5 mm.

11. The process of claim 1, wherein the size of the largest granules in the scrap rubber is in a range from 5 to 8 mm.

12. The process of claim 11, wherein the size of the largest granules in the scrap rubber is about 7 mm.

13. The process of claim 1, wherein the scrap rubber is formed by comminution of molded scrap rubber material.

14. The process of claim 13, wherein the molded scrap rubber material comprises tire tread.

15. The process of claim 1, wherein the mixture comprises 70 to 90 volume percent scrap rubber.

16. The process of claim 15, wherein the mixture comprises about 85 volume percent scrap rubber.

17. The process of claim 1, wherein the molded member has a surface profile at least on a surface to be traffic loaded.

18. The process of claim 17, wherein the surface profile comprises a diamond pattern.

19. The process of claim 1, wherein the molded member has nails or spikes at a surface to be traffic loaded.

20. The process of claim 1, wherein the molded member comprises weight-reducing cavities in a volumetric region distant from a surface to be traffic loaded.

21. The process of claim 1, wherein the mixture of scrap rubber and binder is introduced into the mold at a temperature sufficient for thorough hardening of the binder, and in that heat for vulcanizing the layer is supplied through mold walls.

22. The process of claim 1, wherein forming a molded-member precursor comprises:

lining substantially all surfaces of the cavity of the bottom part of the mold with said cohesive layer to form bottom and side layers, placing the heated mixture in the bottom part of the mold over the bottom and within the side layers, and covering the placed heated mixture with said cohesive layer to form a top layer.

23. The process of claim 22, wherein the top layer and the side layers overlap.

24. The process of claim 1, wherein the scrap rubber and the binder are mixed in a screw mixer.

25. The process of claim 1, wherein said at least one cohesive layer of the precursor provides a traffic-bearing surface of the molded member, and further comprising the step of introducing slipping-resistant elements into the cohesive layer so as to enhance the anti-slipping properties of the traffic-bearing surface.

26. The process of claim 25, wherein the slipping-resistant elements are vulcanized into the cohesive layer.

* * * * *

UNITED STATES PATENT AND TRADEMARK OFFICE
CERTIFICATE OF CORRECTION

PATENT NO. : 5,470,173
DATED : November 28, 1995
INVENTOR(S) : Peter Schmidt

It is certified that error appears in the above-indentified patent and that said Letters Patent is hereby corrected as shown below:

First Page, after item [21], the following information should be included:

```
--[22]  PCT Filed: April 9, 1991
  [86]  PCT No. :  PCT/EP91/00670
```

Signed and Sealed this

First Day of October, 1996

Attest:

BRUCE LEHMAN

Attesting Officer        Commissioner of Patents and Trademarks